United States Patent
Singh et al.

[11] Patent Number: 6,026,354
[45] Date of Patent: Feb. 15, 2000

[54] DEVICE MONITORING SYSTEM WITH DEDICATED BUS AND PROCESSOR

[75] Inventors: Jitendra Kumar Singh, San Jose; Myron Raymond Tuttle, Santa Clara, both of Calif.

[73] Assignee: Hewlett-Packard Company, Palo Alto, Calif.

[21] Appl. No.: 09/131,561

[22] Filed: Aug. 10, 1998

[51] Int. Cl.[7] .................................................. G01R 38/21
[52] U.S. Cl. ........................................ 702/186; 702/188
[58] Field of Search ..................................... 702/182, 183, 702/186, 188; 364/138, 140.07, 140.06, 140.1; 395/200.54, 200.53, 306, 829

[56] References Cited

U.S. PATENT DOCUMENTS

| | | | |
|---|---|---|---|
| 5,778,006 | 7/1998 | Mukai et al. ........................... | 371/22.5 |
| 5,862,338 | 1/1999 | Walker et al. ......................... | 395/200.54 |
| 5,872,942 | 2/1999 | Swanstrom et al. ................... | 395/309 |

*Primary Examiner*—Marc S. Hoff
*Assistant Examiner*—Linh Nguyen

[57] ABSTRACT

A monitoring system within a computing system is set out. The monitoring system monitors components within the computing system. The monitoring system includes a plurality of monitoring devices, a dedicated bus and a controller. The dedicated bus is dedicated for use by the monitoring devices. Each monitoring device is connected to the dedicated bus. The controller is also connected to the dedicated bus. The controller assigns addresses to each monitoring device, stores exception events, and reports the exception events to system software for the computing system.

20 Claims, 3 Drawing Sheets

| DEVICE TYPE | GUIDE | I²C ADDRESS | PHYSICAL LOCATION |
|---|---|---|---|
| . . . | . . . | . . . | . . . |

ADDRESS TABLE

FIGURE 2

DEVICE MONITORING SYSTEM WITH DEDICATED BUS AND PROCESSOR

BACKGROUND

The present invention concerns computer system and pertains particularly to a device monitoring system with a dedicated bus and a dedicated processor.

Computer systems frequently include monitoring devices for sensing anomalous states of the system and system components. Temperature/voltage probes, sense switches to monitor whether the chassis door is open or closed, relays to control power to the system, are examples of such monitoring devices which sense anomalous states of the system and system components.

Monitoring devices have typically been attached to the computing system in an ad hoc manner. Typically, a monitoring device is mapped to some location in memory of the computing system or mapped via I/O registers. The difficulty this creates is that every computing system needs a unique piece of software to communicate with each of the monitoring devices. This unnecessarily proliferates the number of unique pieces of software that need to be written for managing/monitoring the computing system, thus increasing cost for the system vendor.

Some vendors have attempted to solve this problem by using a standard $I^2C$ bus to attach to all of the monitoring devices. The $I^2C$ bus is a hardware bus developed by Philips Semiconductors, having a business address of 811 East Arques Avenue, Sunnyvale, Calif. 94086-4523. The $I^2C$ bus allows a simplified scheme for the attachment of monitoring busses within a computing system; however, use of an $I^2C$ bus leaves a host of other problems not addressed.

For example, monitoring devices connected to a $I^2C$ bus need to be polled by the central processing unit (CPU) of the computing system. This increases the load on the CPU and decreases the performance of the computing system.

Additionally, $I^2C$ addresses for each monitoring device connected to an $I^2C$ must be pre-configured or hard-wired. This reduces flexibility and limits the number of monitoring devices that can be monitored due to a limited number of $I^2C$ addresses (127) available.

Also, monitoring devices need to be individually monitored by the computing system. Thus, as the number of monitoring devices increases so does the number of pieces of monitor device specific monitoring software necessary to be running on the computing system. The specific software pieces often need to be written for multiple operating systems thereby further exacerbating the software writing task.

SUMMARY OF THE INVENTION

In accordance with the preferred embodiment of the present invention, a monitoring system within a computing system is set out. The monitoring system monitors components within the computing system. The monitoring system includes a plurality of monitoring devices, a dedicated bus and a controller. The dedicated bus is dedicated for use by the monitoring devices. Each monitoring device is connected to the dedicated bus. The controller is also connected to the dedicated bus. The controller assigns addresses to each monitoring device, stores exception events, and reports the exception events to system software for the computing system.

In the preferred embodiment of the present invention, the dedicated bus is an $I^2C$ bus. For monitoring devices which do not have processing capability, the controller periodically polls the subset of the monitoring devices which do not have processing capability. The periodic polling is done to detect values which are outside a predetermined range.

For monitoring devices which do have processing capability, upon initialization of the monitoring system, the first monitoring device generates a bus address and transmits the bus address from the first monitoring device to the controller. When the controller determines the bus address is unique, the controller stores the bus address as an address for the first monitoring device, and acknowledges, to the first monitoring device, receipt of the bus address.

In the preferred embodiment of the present invention the controller builds an address table. The address table contains a bus address for each of the monitoring devices.

When a management application within the computing system sends a read or write command to any of the monitoring devices, the controller handles the read or write command. For read and write commands from the management application to a first monitoring device which has processing capability, the read and write commands are forwarded by the controller to the first monitoring device. For read and write commands from the management application to a second monitoring device which has no processing capability, the read and write commands are responded to directly by the controller.

The present invention reduces vendor development costs by reducing the amount of software that needs to be written to support a monitoring system. The development costs are especially reduced when it is required that the monitoring system support multiple operating systems.

The present invention facilitates faster deployment of new systems by making the combination of system software controller firmware and hardware reusable on account of standardization.

The present invention reduces maintenance costs of a monitoring system. Software defects are also reduced because the overall architecture is simplified.

BRIEF DESCRIPTION OF THE DRAWINGS

FIG. 2 shows the format of an address table used by a $I^3C$ controller in accordance with a preferred embodiment of the present invention.

DETAILED DESCRIPTION OF THE PREFERRED EMBODIMENT

Figure 1:
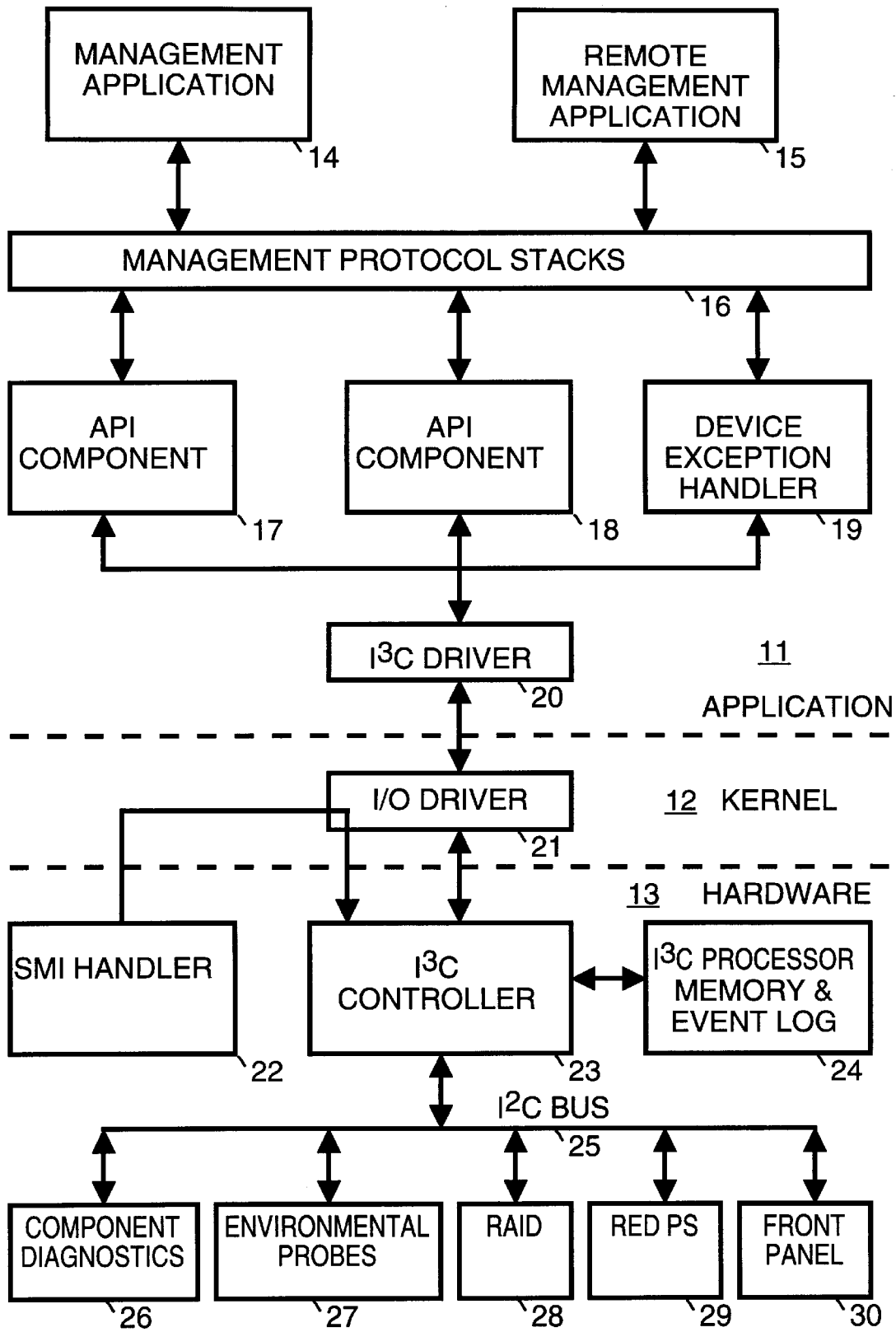
FIG. 1 shows a block diagram showing a device monitoring system integrated within a computing system in accordance with a preferred embodiment of the present invention.

FIG. 1 is a block diagram which shows a device monitoring system integrated within a computing system.

Various monitoring (managed) devices are shown connected to an $I^2C$ bus 25 within a hardware layer 13. The managed devices, shown in FIG. 1 include component diagnostic devices 26, environmental probes 27, redundant array of inexpensive disks (RAID) devices 28, redundant power supplies (red PS) devices 29 and front panel managed devices 30. These are examples of the kind of managed devices that can be implemented in computing systems for monitoring purpose. $I^2C$ bus 25, for example, operates in accordance with industry standards.

Also connected to I²C bus 25 is an I³C controller 23. I³C controller 23 includes a microprocessor, associated firmware, non-volatile random access memory (NVRAM), and random access memory (RAM). I³C controller 23 communicates with the managed devices via I²C bus 25.

I³C controller 23 dynamically assigns I²C addresses to each of the managed devices connected to I²C bus 25. I³C controller 23 polls non-intelligent monitoring devices, such as temperature and voltage probes, among the managed devices for values out of range. I³C controller 23 saves exception events in an NVRAM event log within an I³C processor memory and event log 24. Exception events are not normal for the computing system and indicate potential problems such as temperature too high, ECC memory errors, PCI bus error, and so on. I³C controller 23 communicates exception events to system level software. For remote management applications, I³C controller 23 communicates events via a pager to configured phone numbers. I³C controller 23 facilitates communications via modem to system managers (e.g., using remote management applications as represented in FIG. 1 by remote management application 15) trying to get more information about exception events. I³C controller 23 mediates communication between system software and monitoring devices, for instance for reading a temperature or voltage value.

I³C processor memory and event log 24 is a non-volatile memory in which exception events are stored. Management applications may read or write event log 24 via an event log message interface provided within I³C controller 23.

A system management interrupt (SMI) handler 22 is used to handle special interrupts. SMI handler 22 allows the handling of critical events independent of the operating system. After processing such critical events, SMI hander 22 can optionally trigger a non-maskable interrupt (NMI) so the operating system gets a chance to take appropriate action. For example, ECC memory errors will generate an SMI. For non-correctable double bit errors, SMI handler 22 will trigger an NMI. Most operating systems will shut themselves down when this happens.

An input/output (I/O) driver 21, within a kernel layer 12, is a pass-through driver that mediates the communication between system applications (represented by management application 14 and remote management application 15) and I³C controller 23.

An I³C driver 20, within an application layer 11, provides a high level interface for management applications. I³C driver 20 constructs/formats low-level messages corresponding to the high level commands for the I³C controller 23.

An application program interface (API) component 17 and an application program interface (API) component 18 represent API interfaces for specific managed devices, such as the Redundant Power Supplies and RAID storage devices.

A device exception handler 19 handles exceptions that are specific to a device. For example, RAID 28 supports the ability to "hot swap" disk drives, and if a disk drive is removed from RAID 28, an event is generated. Device exception handler 19 recognizes the generated event and handles the event for RAID 28.

Management protocol stacks 16 are industry standard (or proprietary) management protocols such as SNMP or DMI that are commonly used for system management. High-level management applications interface to the managed devices using the protocols represented by management protocol stacks 16.

Management application 14 and remote management application 15 represent management applications which enable system managers to interface with system management information that is channeled through I³C controller 23.

The device management system shown in FIG. 1 supports two types of managed devices: intelligent devices and dumb devices. Intelligent devices, such as a RAID storage system or a redundant power supply system, use microprocessors to facilitate their management. Intelligent devices support configurable parameters such as I²C addresses and detection and transmission of their own exception conditions. Dumb devices, such as temperature and voltage probes, are assigned fixed addresses at manufacturing time and need to be polled by the I³C controller 23 in order to determine whether an over temperature/voltage condition has been reached.

All managed devices as well as I³C controller 23 are assigned a device type identification (ID), a globally unique identification (GUID), and a physical location. GUID is an industry standard 8 byte statistically unique ID. The physical location is a pre-assigned number which indicates a physical location within the computing system, e.g. Chassis=0, Motherboard=1, Front Panel=2, etc. The device type ID is the same for a class of devices. For example, all RAID storage systems have the same device type ID. The GUID is unique for all devices independent of the device type. GUIDs are generated using an industry standard algorithm and 'burned' into read only memory (ROM) of the intelligent devices at manufacturing time. The device type ID, GUID, and I²C addresses for dumb devices, such as temperature probes, are 'burned' into ROM within I³C controller 23.

On system start-up all intelligent managed devices connected to I²C bus 25 select a random I²C bus address. For example, each intelligent managed device uses its GUID as a seed when generating a random I²C bus address. Once the intelligent managed device has generated a I²C bus address the intelligent managed device uses the I²C bus protocol to transmit a broadcast message to I³C controller 23. The message includes device type, I²C address, a GUID, and physical location. If the transmission is successful and I³C controller 23 does not detect any duplicate I²C address, I³C controller 23 acknowledges the message via an acknowledge message. From that point on the intelligent managed device uses the successful I²C address. If an intelligent managed device does not receive an acknowledge message within a pre-configured time, the intelligent managed device will retry using a different I²C address and continue retrying till an acknowledge message is received, indicating the I²C address selection process is successful.

If, during start-up, two or more intelligent devices 'collide' while trying to select an address, a collision will be detected when the first non unique bit is transmitted. The intelligent managed device that was transmitting a '1' bit when the collision happened will back off and retry the next time I²C bus 25 is available using a different I²C address. In this manner unique I²C address will be assigned to all intelligent devices on I²C bus 25.

From the above initialization procedure the I³C controller 23 builds an address table 40, shown in FIG. 2. Address table 40 is stored in I³C processor memory and event log 24. Address table 40 includes a device type field 41, a GUID field 42, an I²C Address field 43 and a physical location field 44. Address table 41 is used by I³C controller 23 for subsequent communication with the managed devices.

I/O driver 21 communicates with I³C controller 23 via memory mapped I/O. Memory within I³C controller 23 includes a read/write memory buffer. The read/write memory buffer is mapped into the managed system's memory address space. This means that applications and drivers can read or write to this memory just as though they were writing to system memory. Additionally, a control register within I³C controller 23 can be accessed via an I/O instruction. A hardware flag that supports a test-and-set atomic operation controls access to the read/write memory buffer. For read requests, such as a read event log request, I³C controller 23 posts data to the read buffer and triggers an interrupt. I/O driver 21 services the interrupt by reading the control register and determining the action requested, in this case a read request.

To prevent processes from interfering with one another and overwriting read/write buffers within I³C controller 23, the device monitoring system shown in FIG. 1 is single threaded. The single threading is controlled by I³C driver 20. All management applications making a request wait on a documented semaphore controlled by I³C driver 20 before being granted access.

Communication between the management applications and the managed devices, and communication between managed devices and the I³C controller 23 is performed via messages.

Figure 3:
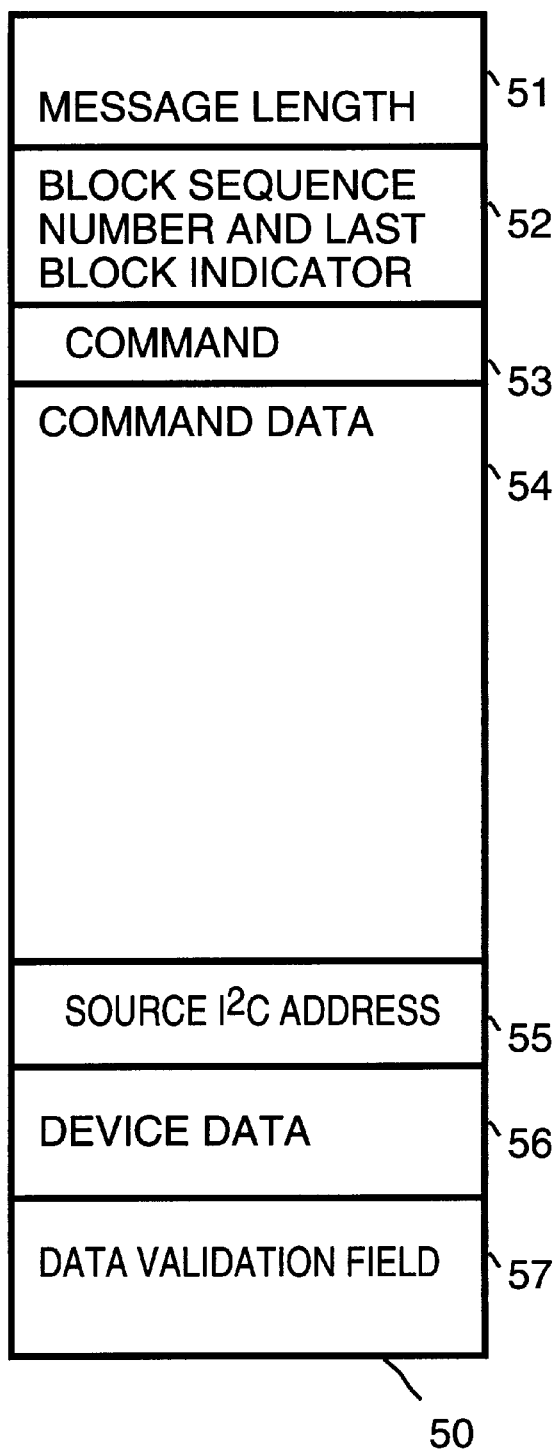
FIG. 3 shows the format of messages sent within the device monitoring system shown in FIG. 1, in accordance with a preferred embodiment of the present invention.

Communication between I³C controller 23 and the management applications and communication between I³C controller 23 and devices is facilitated via messages with message structure 50, as shown in FIG. 3.

A message length section 51 specifies the total message length (including the length of message length section 51) in bytes. Message length section 51 is one byte in length.

A section 52 of message structure 50 contains a block sequence number and last block indicator which is one byte in length. The block sequence number/last block indicator byte is used to sequence messages that are larger than a block (maximum block length is limited by the message length byte). When the most significant bit (MSB) of the block sequence number/last block indicator byte is set, this indicates that this message is the last block of the message, i.e., the message is fully transmitted.

A command section 53 includes a one byte command. The possible commands are listed in Table 1 below:

TABLE 1

| Value | Command | Comment |
| --- | --- | --- |
| 0 | LIST_DEVICE_TYPES | |
| 1 | DEVICE_OPEN | |
| 2 | DEVICE_CLOSE | |
| 3 | READ/WRITE DEVICE | |
| 4 | READ/WRITE_EVENT_ LOG | |
| 5 | REQUEST I²C ADDRESS | valid only for communication from I³C controller 23 to a managed device on I²C bus 25 |
| 6 | ACKNOWLEDGE ADDRESS | valid only for communication from I³C controller 23 to a managed device on I²C bus 25 |
| 7 | ACKNOWLEDGE BLOCK | valid only for communication from I³C controller 23 to a managed device on I²C bus 25 |
| 8 | REPORT_EVENT | valid only for communication from I³C |

TABLE 1-continued

| Value | Command | Comment |
| --- | --- | --- |
| | | controller 23 to a managed device on I²C bus 25 |

The LIST_DEVICE_TYPES command returns device type of a managed device and a GUID list to the requesting application. The command DEVICE_OPEN initiates communication with a managed device. The command DEVICE_CLOSE closes communication with a managed device. The command DEVICE_WRITE writes data to a managed device. The command DEVICE_READ reads data from a managed device. The command READ_EVENT_LOG returns event log data. The command WRITE_EVENT_LOG writes event log data.

A command data section 54 contains data for commands. Table 2 below sets out the data for each command.

TABLE 2

| Command | Data |
| --- | --- |
| DEVICE_OPEN | GUID (8 bytes) required for DEVICE_OPEN request only |
| DEVICE_CLOSE | 0 bytes |
| READ/WRITE DEVICE | 0 bytes |
| READ/WRITE_EVENT_LOG | Index (2 bytes), # bytes to read/write (2 bytes) |
| REQUEST I2C ADDRESS | device I²C address (1 byte) |
| ACKNOWLEDGE ADDRESS | I³C controller 23 I²C address |
| ACKNOWLEDGE BLOCK | Last valid block #. (1 byte), MSB set => Wait acknowledge. |
| REPORT_EVENT | 0 bytes |

A section 55 contains a source I²C address. Section 55 is utilized only for communications from the I³C microprocessor and firmware block (controller) 23 to an I²C device.

A section 56 contains data specific to a device. The device specific data includes device control. The device specific data is interpreted by the device receiving the message.

A section 57 includes two bytes of a data validation field. The data validation field contains a CRC16 or checksum.

In a typical scenario, a management application initializes itself with a LIST_DEVICE_TYPES request. This request returns a list of managed devices along with their GUIDs. The management application then saves the GUIDs of managed devices the management application is interested in managing. All future communications between the management application and the managed devices uses the device GUIDs as an identifying key. The I³C controller 23 uses the GUIDs in these subsequent requests to obtain the I²C address of the target managed device.

Subsequent communication between a management application and I³C controller 23 is initiated by a device open request (DEVICE_OPEN) command. This request includes as a parameter the GUID of the target device (obtained during initialization). If the request is valid, I³C controller 23 returns a valid handle. If the request is not valid, I³C controller 23 returns an error code.

After a successful device open request, a management application can make a DEVICE_READ or a DEVICE_WRITE request. These must be followed by a DEVICE_CLOSE request to end the transaction.

Requests made of I³C controller 23 (LIST_DEVICE_TYPES, READ/WRITE_EVENT_LOG) do not require a DEVICE_OPEN or DEVICE_CLOSE request since no address translation or device GUID is needed. However, I³C controller 23 maintains a state as though an OPEN request had been made, so other requests are rejected till this request completes. A DEVICE_CLOSE command is also not necessary since it is implicit.

If a managed device on I²C bus 25 makes a request while I³C controller 23 is busy handling another request, I³C controller 23 returns a negative acknowledge. The open and close requests are required for dumb managed devices such as LM78 controllers that are managed by I³C controller 23. Thus, from the perspective of a management application, the dumb managed devices behave as though dumb managed devices were intelligent devices.

For example, if there is a temperature probe, I³C controller 23 will list the temperature probe in response to a LIST_DEVICE_TYPES request from a management application. A management application wanting to read a temperature value will then go through the above process of doing a DEVICE_OPEN, and DEVICE_READ. I³C controller 23 will recognize the GUID in the DEVICE_OPEN request as belonging to a device I³C controller 23 is managing and will then handle the DEVICE_READ request appropriately—instead of writing the request out to I²C bus 25.

Message structure 50 also is used for messages which I³C controller 23 sends to managed devices. For messages from I³C controller 23 to managed devices, command data section 54 contains data for commands the commands in command section 53 are as in Table 3 below.

TABLE 3

| Value | Command | Comment |
|---|---|---|
| 1 | DEVICE_OPEN | Initiates communication with a device. |
| 2 | DEVICE_CLOSE | Closes communication with a device. |
| 3 | Unused | |
| 4 | Unused | |
| 5 | REQUEST I2C ADDRESS | Issued by a managed device to establish an I²C address. |
| 6 | ACKNOWLEDGE ADDRESS | Issued by the I³C controller 23 to the managed device requesting an I²C address |
| 7 | ACKNOWLEDGE BLOCK | Issued by either a managed device or the I³C controller 23 to acknowledge a block. This command is also used to negatively acknowledge a DEVICE_OPEN request if a device or I³C controller 23 is busy handling another request. This considerably simplifies the programming of firmware for I³C controller 23 making communication between I³C controller and managed devices "single threaded". Managed devices receiving a negative acknowledge wait a random length time out and re-issue the request. |
| 8 | REPORT_EVENT | Issued by managed devices to report exception events as they occur. |

The event log structure is as set out in Table 4 below:

TABLE 4

| Data Type | Number of Bytes | Description |
|---|---|---|
| Device Index | one byte | index into the address table |
| Date/Time | four bytes | seconds since Jan. 1, 1990 |
| Event Code | one byte | specific to a managed device |
| Event Data | sixteen bytes | |

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A method for monitoring components within a computing system, the method comprising the following steps:
   (a) connecting a plurality of monitoring devices on a dedicated bus dedicated for use by monitoring devices;
   (b) connecting a controller to the dedicated bus;
   (c) assigning, by the controller, a bus address for each monitoring device in the plurality of monitoring devices;
   (d) storing, by the controller, exception events; and,
   (e) reporting, by the controller, the exception events to system software for the computing system.

2. A method as in claim 1 wherein in step (a) the dedicated bus is an I²C bus.

3. A method as in claim 1 wherein step (d) includes the following substep:
   (d.1) periodically polling a subset of the monitoring devices which do not have processing capability, the periodic polling being done to detect values of a predetermined range.

4. A method as in claim 1 wherein for a first monitoring device which has processing capability, step (c) includes the following substeps:
   (c.1) generating, by the first monitoring device, a bus address,
   (c.2) transmitting the bus address from the first monitoring device to the controller; and,
   (c.3) performing the following substeps by the controller if the bus address is unique:
      storing the bus address as an address for the first monitoring device, and
      acknowledging to the first monitoring device, receipt of the bus address.

5. A method as in claim 1 wherein step (c) includes building an address table by the controller, the address table containing a bus address for each of the monitoring devices.

6. A method as in claim 1 wherein step (e) includes handling, by the controller, monitoring device read and write commands sent to monitoring devices from a management application within the computing system.

7. A method as in claim 6 wherein:
   for read and write commands to a first monitoring device which has processing capability, the read and write commands are forwarded by the controller to the first monitoring device; and,
   for read and write commands to a second monitoring device which has no processing capability, the read and write commands are responded to directly by the controller.

8. A computing system, comprising:
a monitoring system for monitoring components within the computing system, monitoring system comprising:
   a plurality of monitoring devices,
   a dedicated bus dedicated for use by the monitoring devices, each monitoring device being connected to the dedicated bus, and
   a controller connected to the dedicated bus, the controller for assigning a bus for each monitoring device in the plurality of monitoring devices, for storing exception events and for reporting the exception events to system software for the computing system.

9. A computing system as in claim 8 wherein the dedicated bus is an $I^2C$ bus.

10. A computing system as in claim 8 wherein a subset of the monitoring devices do not have processing capability, and the controller periodically polls the subset of the monitoring devices which do not have processing capability, the periodic polling being done to detect values which are outside of a predetermined range.

11. A computing system as in claim 8 wherein the monitoring devices includes a first monitoring device which has processing capability, upon initialization of the monitoring system, the first monitoring device generates a bus address and transmits the bus address from the first monitoring device to the controller;
   wherein when the controller determines the bus address is unique, the controller stores the bus address as an address for the first monitoring device, and acknowledges, to the first monitoring device, receipt of the bus address.

12. A computing system as in claim 8 wherein the controller is also for building an address table by the controller, the address table containing a bus address for each of the monitoring devices.

13. A computing system as in claim 8 additionally comprising:
   a management application, wherein the controller handles read and write commands sent from the management application to the monitoring devices.

14. A computing system as in claim 13 wherein for read and write commands from the management application to a first monitoring device which has processing capability, the read and write commands are forwarded by the controller to the first monitoring device, and wherein for read and write commands from the management application to a second monitoring device which has no processing capability, the read and write commands are responded to directly by the controller.

15. A monitoring system for monitoring components within a computing system, monitoring system comprising:
   a plurality of monitoring devices,
   a dedicated bus dedicated for use by the monitoring devices, each monitoring device being connected to the dedicated bus; and,
   a controller connected to the dedicated bus, the controller for assigning a bus address for each monitoring device, for storing exception events and for reporting the exception events to system software for the computing system.

16. A monitoring system as in claim 15 wherein the dedicated bus is an $I^2C$ bus.

17. A monitoring system as in claim 15 wherein a subset of the monitoring devices do not have processing capability, and the controller periodically polls the subset of the monitoring devices which do not have processing capability, the periodic polling being done to detect values which are outside of a predetermined range.

18. A monitoring system as in claim 15 wherein the monitoring devices includes a first monitoring device which has processing capability, upon initialization of the monitoring system, the first monitoring device generates a bus address and transmits the bus address from the first monitoring device to the controller;
   wherein when the controller determines the bus address is unique, the controller stores the bus address as an address for the first monitoring device, and acknowledges, to the first monitoring device, receipt of the bus address.

19. A monitoring system as in claim 15 the controller handles read and write commands sent to the monitoring devices from a management application within the computing system.

20. A monitoring system as in claim 19 wherein for read and write commands from the management application to a first monitoring device which has processing capability, the read and write commands are forwarded by the controller to the first monitoring device, and wherein for read and write commands from the management application to a second monitoring device which has no processing capability, the read and write commands are responded to directly by the controller.

* * * * *